(12) United States Patent
Schaefer et al.

(10) Patent No.: US 6,175,695 B1
(45) Date of Patent: Jan. 16, 2001

(54) MANUALLY OPERABLE FLASHLIGHT UNIT

(75) Inventors: Klaus Dieter Schaefer; Walter Bletz, both of Braunfels (DE)

(73) Assignee: Leica Camera AG, Solms (DE)

( * ) Notice: Under 35 U.S.C. 154(b), the term of this patent shall be extended for 0 days.

(21) Appl. No.: 09/301,623

(22) Filed: Apr. 29, 1999

(30) Foreign Application Priority Data

Apr. 29, 1998 (DE) .............................. 198 19 111

(51) Int. Cl.$^7$ .................................................. G03B 15/03
(52) U.S. Cl. ............................................. 396/160; 396/198
(58) Field of Search .................... 396/155, 159, 396/160, 161, 163, 198

(56) References Cited

U.S. PATENT DOCUMENTS

| | | | |
|---|---|---|---|
| 4,268,139 | * 5/1981 | Uchiyama et al. | 396/161 |
| 4,315,679 | * 2/1982 | Nakamura | 396/198 |
| 4,329,624 | * 5/1982 | Kamon et al. | 396/198 |
| 4,494,851 | * 1/1985 | Maida et al. | 396/163 |
| 4,500,190 | * 2/1985 | Kuroki | 396/163 |
| 4,573,786 | * 3/1986 | Taniguchi et al. | 396/159 |
| 4,595,267 | 6/1986 | Kuroki | 354/413 |
| 4,697,907 | * 10/1987 | Terui et al. | 396/159 |
| 4,701,041 | * 10/1987 | Serikawa | 396/180 |
| 4,704,023 | * 11/1987 | Curran | 396/160 |
| 4,887,120 | 12/1989 | Kobayashi et al. | 354/416 |
| 4,970,538 | * 11/1990 | Ichikawa et al. | 396/190 |
| 5,272,500 | * 12/1993 | Taniguchi et al. | 396/155 |

FOREIGN PATENT DOCUMENTS

| | | |
|---|---|---|
| 32 20 330 | 12/1982 | (DE) . |
| 33 47 149 | 7/1985 | (DE) . |
| 35 03 726 | 8/1985 | (DE) . |

\* cited by examiner

*Primary Examiner*—Russell Adams
(74) *Attorney, Agent, or Firm*—Foley & Lardner

(57) ABSTRACT

A manually operable flashlight unit (10) having a foot part (11) fitting a finder shoe (6) on a camera (1), standard contacts (9') for chassis ground and (8') for flash release being arranged in the foot part (11), has the additional feature that a single further contact (7') is provided in the foot part (11) for a bidirectional information exchange between a circuit arrangement (13) contained in the flashlight unit (10) and a circuit arrangement (12) arranged in the camera (1).

16 Claims, 1 Drawing Sheet

MANUALLY OPERABLE FLASHLIGHT UNIT

BACKGROUND OF THE INVENTION

1. Field of the Invention

The invention relates generally to flashlights, and more particularly to a manually operable flashlight unit having a foot part fitting a finder shoe on a camera, standard contacts for chassis ground and flash release being arranged in the foot part.

2. Description of the Related Art

In flashlight units of this type, the flash is released by the camera via the so-called X contact, and the flash is switched off by a photodiode incorporated in the flashlight unit together with an evaluation electronic system as soon as a sufficient light intensity is reached. The adaptation to different lens diaphragms (apertures) and film speeds is performed via a change-over switch fitted on the flashlight unit.

The internal automatic switch-off device of the flashlight unit can also be disconnected so that the flash always shines with its full intensity. In the case of this so-called manual mode, the diaphragm must then be set manually at the lens in accordance with the desired range and film speed, in order to achieve the suitable brightening up from the flash.

Flashlight units integrated in compact cameras generally operate only in manual mode. The automatically setting diaphragm is calculated from the fixed guide number of the integrated flash and the measured range. The flash intensity and the flash duration are not controlled.

It is also known, for example from DE 32 21 856 A1, to arrange further contacts in the foot part of the flashlight unit and in the finder shoe of the camera in addition to the X contact. The available space is very restricted, with the result that at most two further contacts are provided in general. The position and importance of these contacts are usually specific to the company, while the shape of the foot part and finder shoe as well as the position of the contacts for the chassis ground in the respective outer molded part, and of the X contact in the central position, are fixed by an international standard. It is possible, for example, for the mounted flashlight unit to be switched on and a flash-ready signal to be sent to the camera via the further contacts.

When the flashlight unit is switched on, the flash capacitor integrated in the unit is charged in a certain time. When the necessary charge is reached, the flashlight unit transmits a signal to the camera via the flash-ready contact. Normally, the signal comprises a voltage level of a few volts with respect to ground, which, for example, is used for a display in the camera or triggers the shutter release. The designation AX contact has become established for this contact.

The flash power of separate flashlight units which can be mounted on the camera is substantially higher than that of a flashlight unit integrated in the camera, since the power supply via batteries and the installation space for charging capacitors in the camera are restricted. It is therefore desired also to be able to mount an external flashlight unit on cameras with an integrated flashlight unit. However, the problem arises in this case, on the one hand, of being able to disconnect the integrated flashlight unit as automatically as possible and, on the other hand, of switching the external flashlight unit into the same operating mode as the integrated flashlight unit. Given the multiplicity of already existing contact arrangements and dimensions, standardized overall, of the finder shoe, it is not possible in a technically sensible way to fit further contacts or switches. Moreover, additional contacts in the foot part of the flashlight unit would restrict its usefulness on different cameras.

The present invention is directed to overcoming or at least reducing the effects of one or more of the problems set forth above.

SUMMARY OF THE INVENTION

The present invention is directed to creating a flashlight unit which can be mounted on different camera models and by means of which it is also possible to realize particular requirements in the case of individual camera models.

According to an embodiment of the invention, in the case of a flashlight unit of the type mentioned in the beginning, in addition to the two standard contacts, a single further contact is provided for bidirectional information exchange between circuit arrangements in the flashlight unit and in the camera. This contact is advantageously an AX contact. In this case, inside the flashlight unit the further contact is assigned a circuit arrangement by means of which, firstly, a flash-ready signal to be transmitted to the camera is generated, and which generates a flash-mode control signal from a signal triggered by the camera as a function of said flash-ready signal. The flash-ready signal can comprise a specific signal voltage level which, in the event of shutter release by the circuit arrangement in the camera, can be varied to a lower signal voltage level which can be detected by the circuit arrangement in the flashlight unit. The flash-mode control signal can effect the manual mode setting through which the camera exerts control.

Using only one further contact, whose function is primarily controlled by the flashlight unit, the flashlight unit can be used on all cameras which contain only the standard contacts in their finder shoe. The further contact then has no counter pole. The camera can therefore not react to the flash-ready signal provided, with the result that in the event of flash release via the X contact, the operating mode respectively set on the flashlight unit comes into effect. The flash readiness must be observed via a display on the flashlight unit.

In the case of cameras having an AX contact which makes contact with the further contact in the foot part of the flashlight unit, the flash-ready signal can, furthermore, be used to display and/or to trigger the shutter release. To the extent that no additional change signal is generated by the camera, the flashlight unit can likewise be used in the respectively set operating mode via the shutter release and the X contact.

In addition, however, it is also possible, for example, to equip compact cameras with a finder shoe and suitable AX contact, and to provide inside the camera a circuit arrangement which, as a function of the flash-ready signal, on the one hand switches off an integrated flashlight unit and, on the other hand, undertakes to change the signal voltage level at the AX contact so that the flashlight unit is switched by its circuit arrangement into an operating mode which is matched to the integrated flashlight unit.

In the case of cameras with further contacts, for example for automatically switching on the flashlight unit, the flashlight unit according to the invention can likewise be used, but only after being switched on manually.

Briefly, according to one aspect of the present invention, there is provided a manually operable flashlight unit having a foot part fitting a finder shoe on a camera. Standard contacts for chassis ground and for flash release are arranged in the foot part. A single further contact is provided in the foot part for bidirectional information exchange between a circuit arrangement contained in the flashlight unit and a circuit arrangement arranged in the camera.

Briefly, according to another aspect of the present invention, there is provided a flashlight unit for use with a camera. The flashlight unit includes a bidirectional information exchange contact and a flashlight circuit. The flashlight circuit is electrically coupled to the bidirectional information exchange contact. The bidirectional information exchange contact allows bidirectional communication between the flashlight circuit and a camera circuit on the camera. The flashlight circuit generates communication signals for the camera circuit and is adapted to receive communication signals from the camera circuit via the bidirectional information exchange contact.

Briefly, according to another aspect of the present invention, there is provided a camera system. The camera system includes a camera and a flashlight unit. The camera includes a camera-side bidirectional information exchange contact and a camera circuit. The camera circuit is electrically coupled to the camera-side bidirectional information exchange contact. The flashlight unit includes a flash-side bidirectional information exchange contact and a flashlight circuit. The flash-side bidirectional information exchange contact can be mated with the camera-side bidirectional information exchange contact. The flashlight circuit is electrically coupled to the flash-side bidirectional information exchange contact. Mating of the flash-side bidirectional information exchange contact and the camera-side bidirectional information exchange contact allows bidirectional communication between the camera circuit and the flashlight circuit. The flashlight circuit generates communication signals for the camera circuit and is adapted to receive communication signals from the camera circuit via the flash-side bidirectional information exchange contact. The camera circuit generates communication signals for the flashlight circuit and is adapted to receive communication signals from the flashlight circuit via the camera-side bidirectional information exchange contact.

BRIEF DESCRIPTION OF THE DRAWINGS

An exemplary embodiment of the flashlight unit according to the invention is represented schematically in the drawings, in which.

DESCRIPTION OF SPECIFIC EMBODIMENTS

The invention is explained in more detail below with the aid of the figures.

Figure 1:
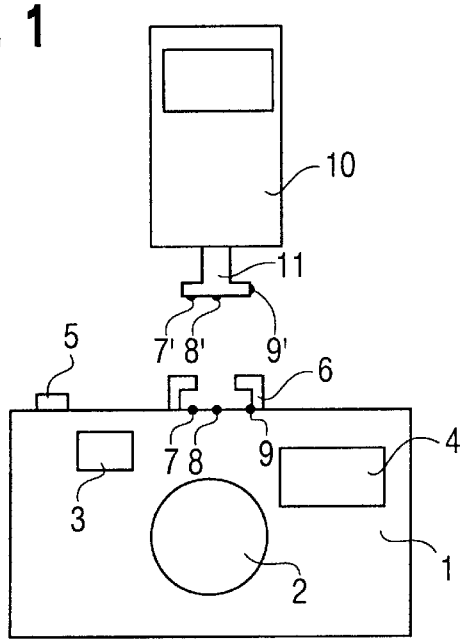
FIG. 1 shows a camera with an integrated flashlight unit and an additional external flashlight unit.

Referring to FIG. 1, a camera 1 having a lens 2 and viewfinder 3 contains an integrated flashlight unit 4 which is usually ignited by actuating the shutter release 5. The flashlight unit 4 is operated in manual mode, that is to say, the flash intensity and flash duration are definitively prescribed.

Figure 2:
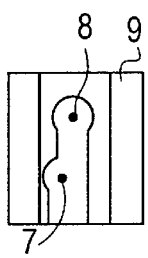
FIG. 2 shows a plan view of an example of a suitable finder shoe.

Located on the camera 1 is a finder shoe 6 in which two contacts 7 and 8 are indicated. A further contact 9 is connected in an electrically conducting fashion directly to the finder shoe 6 and forms the chassis ground. The centrally positioned contact 8 is the X contact, and the contact 7 situated alongside is to be an AX contact. The contacts are represented in a plan view of the finder shoe 6 in FIG. 2.

An external flashlight unit 10 contains a foot part 11, on which mutually corresponding contacts 7', 8', and 9' are located. The respective contacts are closed when the foot part 11 is pushed into the finder shoe 6.

Figure 3:
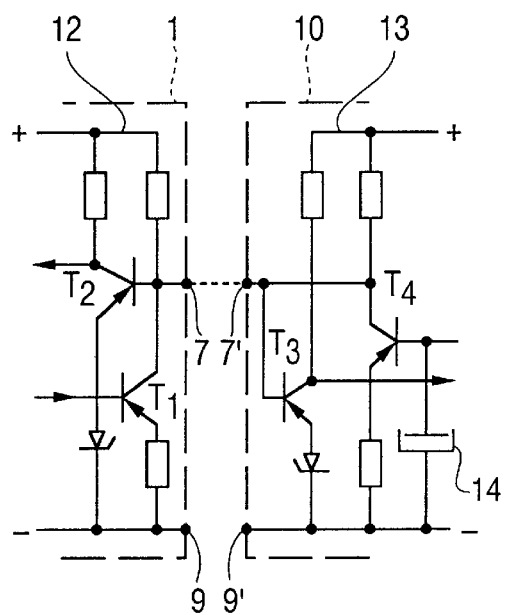
FIG. 3 shows an example of suitable circuit arrangements in the camera and flashlight unit.
Figure 4:
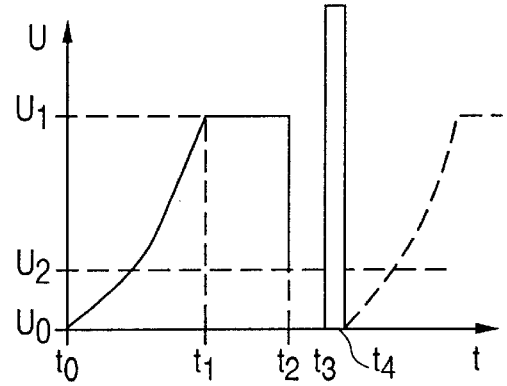
FIG. 4 shows a voltage/time diagram of the flash control.

Represented by way of example in FIG. 3 are circuit arrangements 12 and 13 which are located in the camera 1, on the one hand, and in the flashlight unit 10, on the other hand and are assigned to the contacts 7, 7'. A bidirectional information exchange takes place via the contact bridge 7, 7'. The readiness of the flash charge is displayed in the direction from the flashlight unit 10 to the camera 1. A control signal for the flash operating mode is generated in the direction from the camera 1 to the flashlight unit 10. The functional elements in accordance with FIG. 3 are usually contained in a mass-produced fashion in microprocessors used to control cameras and flashlight units. The circuit arrangements represented serve only to provide a graphic illustration, reference being made to FIG. 4 for the voltage profile at the charging capacitor 14 of the flashlight unit 10.

After the flashlight unit 10 has been switched on via the transistor T4, the charging capacitor 14 is gradually charged between the instants t0 and t1. As a result, the voltage at the contacts 7, 7' likewise rises until the full charging voltage U1 is reached at the instant t1. The result of this is that the input transistor T2 of the camera circuit arrangement 12 is turned on and thereby emits to the camera a control signal which can be further processed in any desired way. In particular, a flash-ready display can be switched on thereby, and the function of the integrated flash light unit 4 can be closed down.

If the camera 1 is triggered at the instant t2, the output transistor T1 is driven in a suitable way and, for its part, draws the voltage at the contacts 7, 7' to a lower value U2. The result of this is that the input transistor T3 in the circuit arrangement 13 integrated in the flashlight unit 10 emits a switching signal which, for its part, can be used to control the mode of operation of the flashlight unit 10. It is possible, for example, to regulate the power output of the flash via this signal. Such circuit arrangements are known. They serve the purpose, for example, of adapting the flash intensity to the film speed. However, the signal can, in particular, also be used to set the manual mode in the flashlight unit 10.

Since a certain time is required for the specified switchover in the flashlight unit 10, the ignition of the flash is not performed via the X contact 8, 8' until the instant t3. By the instant t4, the charging capacitor 14 has been discharged and the voltage at the contacts 7, 7' reverts to zero. This is detected by the circuit arrangement 12 via the transistor T1 as a non-ready signal, and the initial state is reached once again.

The principles, preferred embodiment, and modes of operation of the present invention have been described in the foregoing specification. The invention is not to be construed as limited to the particular forms disclosed, because these are regarded as illustrative rather than restrictive. Moreover, variations and changes may be made by those of ordinary skill in the art without departing from the spirit and scope of the invention.

German application no. DE 198 19 111.1, filed on Apr. 29, 1998, is hereby incorporated by reference in its entirety as if fully set forth herein.

We claim:

1. A manually operable flashlight unit comprising:

a foot part fitting a finder shoe on a camera, two contacts respectively for chassis ground and for flash release being arranged in the foot part, a circuit arrangement, and a single further contact in the foot part for bidirectional information exchange between the circuit arrangement contained in the flashlight unit and a circuit arrangement arranged in the camera, wherein said two contacts and said single further contact are the only contacts in the foot part of said flashlight unit.

2. The flashlight unit as claimed in claim 1, wherein the position of the further contact corresponds to that of a contact normally used for transmitting a flash-ready signal from the flashlight unit to the camera.

3. The flashlight unit as claimed in claim 1, wherein the circuit arrangement in the flashlight unit outputs a flash-ready signal to the camera and receives a flash-mode control signal from the camera in response to said flash-ready signal.

4. The flashlight unit as claimed in claim 3, wherein the flash-ready signal comprises a voltage level, and the flash-mode control signal received by the circuit arrangement in the flashlight unit comprises a reduction of this voltage level.

5. The flashlight unit as claimed in claim 3, wherein the flash-mode control signal variably sets at least one of flash duration and intensity.

6. A flashlight unit for use with a camera, the flashlight unit comprising:

a chassis around contact for chassis ground;

a flash release contact for flash release;

a bidirectional information exchange contact; and a flashlight circuit electrically coupled to the bidirectional information exchange contact;

wherein the bidirectional information exchange contact allows bidirectional communication between the flashlight circuit and a camera circuit on the camera, and wherein the flashlight circuit generates communication signals for the camera circuit and is adapted to receive communication signals from the camera circuit via the bidirectional information exchange contact, and wherein said chassis ground contact, said flash release contact, and said bidirectional information exchange contact are the only contacts for said flashlight unit.

7. The flashlight unit as claimed in claim 6, further comprising a foot part, wherein the foot part is adapted to fit a finder shoe on the camera, and wherein the foot part includes the bidirectional information exchange contact.

8. The flashlight unit as claimed in claim 7, wherein:

the chassis ground contact has a position in the foot part which corresponds to that of an industry standard chassis ground contact;

the flash release contact has a position in the foot part which corresponds to that of an industry standard X contact; and the bidirectional information exchange contact has a position in the foot part which corresponds to that of an industry standard AX flash-ready contact.

9. The flashlight unit as claimed in claim 6, wherein:

the flashlight circuit supplies a flash-ready signal to the bidirectional information exchange contact, for the camera circuit, indicating that the flashlight unit is charged and ready to provide a flash; and the flashlight circuit is adapted to receive a flash-mode control signal from the camera circuit, via the bidirectional information exchange contact, in response to the flash-ready signal, providing the flashlight unit information on mode of operation.

10. The flashlight unit as claimed in claim 9, wherein the flash-ready signal is an electrical signal having a voltage in a first specified range and the flash-mode control signal is an electrical signal having a voltage in a second specified range which is lower than the first specified range.

11. The flashlight unit as claimed in claim 6, wherein:

the flashlight circuit supplies a flash-ready signal to the bidirectional information exchange contact, for the camera circuit, indicating that the flashlight unit is charged and ready to provide a flash; and the flashlight circuit is adapted to receive from the camera circuit a power output control signal, via the bidirectional information exchange contact, in response to the flash-ready signal, providing the flashlight unit information on flash intensity.

12. The flashlight unit as claimed in claim 6, wherein the flashlight circuit comprises:

a first switch which switches when the flashlight unit is charged and ready to provide a flash, thereby providing a voltage within a first specified range; and a second switch which switches in response to a voltage at the bidirectional information exchange contact which is in a second specified range, wherein the second specified range is lower than the first specified range.

13. The flashlight unit as claimed in claim 12, wherein:

the first switch is a first transistor with a terminal, and the terminal of the first transistor receives an indication of a charge level of the flashlight unit; and the second switch is a second transistor with a terminal, and the terminal of the second transistor is electrically coupled to the bidirectional information exchange contact to receive an indication of the voltage at the bidirectional information exchange contact.

14. A camera system, comprising:

a camera, including a camera-side chassis ground contact for chassis ground;

a camera-side flash release contact for flash release;

a camera-side bidirectional information exchange contact; and a camera circuit electrically coupled to the camera-side bidirectional information exchange contact; and a flashlight unit, including a flash-side chassis ground contact for chassis ground which can be mated with the camera-side chassis ground contact;

a flash-side flash release contact for flash release which can be mated with the camera-side flash release contact;

a flash-side bidirectional information exchange contact which can be mated with the camera-side bidirectional information exchange contact; and a flashlight circuit electrically coupled to the flash-side bidirectional information exchange contact;

wherein:

mating of the flash-side bidirectional information exchange contact and the camera-side bidirectional information exchange contact allows bidirectional communication between the camera circuit and the flashlight circuit;

the flashlight circuit generates communication signals for the camera circuit and is adapted to receive communication signals from the camera circuit via the flash-side bidirectional information exchange contact; and the camera circuit generates communication signals for the flashlight circuit and is adapted to receive communication signals from the flashlight circuit via the camera-side bidirectional information exchange contact, the flash-side chassis ground contact, the flash-side flash release contact, and the flash-side bidirectional information exchange contact are the only contacts for the flashlight unit.

15. The camera system as claimed in claim 14, wherein:

the camera further includes a finder shoe which contains the camera-side chassis ground contact, the camera-side flash release contact, and the camera-side bidirectional information exchange contact; and the flashlight unit further includes a foot part which is adapted to mate with the finder shoe, the foot part including the flash-side chassis ground contact, the flash-side flash release contact, and the flash-side bidirectional information exchange contact.

16. The camera system as claimed in claim 15, wherein:

the flash-side chassis ground contact has a position in the foot part which corresponds to that of an industry standard chassis ground contact;

the flash-side flash release contact has a position in the foot part which corresponds to that of an industry standard X contact; and the flash-side bidirectional information exchange contact has a position in the foot part which corresponds to that of an industry standard AX flash-ready contact.

* * * * *